US012675164B2

(12) United States Patent
Gangjee et al.

(10) Patent No.: US 12,675,164 B2
(45) Date of Patent: Jul. 7, 2026

(54) GENERATIVE MESSAGING USING SEQUENTIALLY ACTIVE DISPLAY

(71) Applicant: Synchron Australia Pty Limited, Dover, DE (US)

(72) Inventors: Javed Gangjee, Dover, DE (US); Katerina Prastakou, Dover, DE (US)

(73) Assignee: Synchron Australia Pty Limited, St Kilda East (AU)

( * ) Notice: Subject to any disclaimer, the term of this patent is extended or adjusted under 35 U.S.C. 154(b) by 0 days.

(21) Appl. No.: 19/400,961

(22) Filed: Nov. 25, 2025

(65) Prior Publication Data

US 2026/0147412 A1     May 28, 2026

Related U.S. Application Data

(60) Provisional application No. 63/724,808, filed on Nov. 25, 2024.

(51) Int. Cl.
| | |
|---|---|
| *G06F 3/01* | (2006.01) |
| *G06F 3/0481* | (2022.01) |
| *G06F 3/0482* | (2013.01) |
| *G06F 3/0485* | (2022.01) |
| *G06F 3/0487* | (2013.01) |

(52) U.S. Cl.
CPC ............ *G06F 3/015* (2013.01); *G06F 3/0481* (2013.01); *G06F 3/0482* (2013.01); *G06F 3/0485* (2013.01); *G06F 3/0487* (2013.01)

(58) Field of Classification Search
CPC .................... G06F 3/015; G06F 3/048–04886
See application file for complete search history.

(56) References Cited

U.S. PATENT DOCUMENTS

| | | | | |
|---|---|---|---|---|
| 7,546,158 | B2 * | 6/2009 | Allison | G06F 3/015 |
| | | | | 60/545 |
| 9,606,634 | B2 * | 3/2017 | Assadollahi | G06F 40/274 |
| 10,551,915 | B2 * | 2/2020 | Kristensson | G06F 3/04842 |
| 10,795,440 | B1 * | 10/2020 | Chevillet | G06F 3/015 |
| 11,468,351 | B1 * | 10/2022 | Choma | G06F 3/015 |
| 12,053,308 | B2 * | 8/2024 | Alcaide | A61B 5/16 |
| 12,260,774 | B2 * | 3/2025 | Gangjee | G09B 21/00 |
| 12,373,040 | B2 * | 7/2025 | Winters, IV | G06V 20/20 |
| 12,530,526 | B2 * | 1/2026 | Geramifard | G06F 3/017 |
| 2013/0152000 | A1 * | 6/2013 | Liu | G06F 9/451 |
| | | | | 715/765 |
| 2015/0100537 | A1 * | 4/2015 | Grieves | G06N 5/02 |
| | | | | 706/52 |
| 2015/0347379 | A1 * | 12/2015 | Chaudhri | G06F 3/04886 |
| | | | | 715/773 |
| 2017/0052703 | A1 * | 2/2017 | Bi | G06F 3/0237 |
| 2019/0073026 | A1 * | 3/2019 | Kristensson | G06T 11/60 |
| 2020/0337653 | A1 * | 10/2020 | Alcaide | A61B 5/16 |
| 2024/0298946 | A1 * | 9/2024 | Wang | A61B 5/168 |
| 2024/0329751 | A1 * | 10/2024 | Winters, IV | G06N 5/01 |
| 2024/0404428 | A1 * | 12/2024 | Gangjee | G09B 21/00 |
| 2024/0411989 | A1 * | 12/2024 | Hill | G06F 40/274 |
| 2025/0138635 | A1 | 5/2025 | Bennett et al. | |
| 2025/0186001 | A1 * | 6/2025 | Alcaide | A61B 5/16 |
| 2025/0209935 | A1 * | 6/2025 | Gangjee | G09B 21/00 |
| 2025/0259002 | A1 * | 8/2025 | Geramifard | G06F 3/017 |
| 2025/0362751 | A1 * | 11/2025 | Quesada | G06F 21/32 |

* cited by examiner

*Primary Examiner* — Patrick F Marinelli
(74) *Attorney, Agent, or Firm* — Holland & Hart LLP

(57)     ABSTRACT

Methods and systems for using generative content to improve the ability of an individual to communicate using electronic-assisted communication.

26 Claims, 11 Drawing Sheets

GENERATIVE MESSAGING USING SEQUENTIALLY ACTIVE DISPLAY

CROSS-REFERENCE TO RELATED APPLICATIONS

This application is a non-provisional of U.S. Provisional Application 63/724,808, filed Nov. 25, 2024, the entirety of which is incorporated by reference.

FIELD OF THE INVENTION

Methods and systems for using generative content to improve the ability of an individual to communicate using electronic-assisted communication.

BACKGROUND OF THE INVENTION

The availability of brain-computer interfaces (BCIs) allows users to provide instructions to the BCI using an endogenous, exogenous signal, or a combination of signals. The use of such BCIs can improve the ability of the individual to regain lost independence, including the ability to interact with his or her environment with increased autonomy. Typically, an endogenous signal is a signal that the individual generates internally. Such endogenous signals can include neural signals detected by sensors that measure electrical impulses produced when the individual generates a thought, moves a muscle (either through actual movement or imagined movement in the case of a paralyzed individual), etc. A BCI can directly infer motor intent by detecting local brain signals and transmitting the motor control signal out of the brain to generate a motor output, referred to as a digital motor output (DMO), and subsequently use that endogenous DMO to control computer actions or control other electronic devices.

Exogenous signals can include any signal where the individual takes an action that is measured or generated externally to the individual. For example, exogenous signals can include a signal generated when the individual triggers an external mechanism or electronic device (e.g., a mouse click, screen contact/tap, keyboard click, voice command, etc.), a signal received by an inertial sensor that uses inertia to detect physical movement of a body part of the individual. A signal is received using a sensor including, but not limited to, an accelerometer, gyroscopes, and a camera-type device that detects movement of a body part of an individual (e.g., an eye movement detector, a body movement detector, etc.), sip and puff controls (typically used for wheelchairs), etc.

People with full or partial paralysis, disabilities, or other muscular disorders tend to be limited in the amount of information they can communicate per unit of time. While assistive technologies, such as eye trackers and BCIs, can facilitate communication, the speed of communication is typically slow with conventional systems. For example, if an impaired individual attempts to spell out a sentence, they would typically do this by spelling out each character in the sentence at a slow speed, which can be a painstaking process if they only have access to a limited number of inputs that can be generated to interact with the BCI. The concepts here can use generative content innovations in user interfaces (UI) and personalization that significantly enhance speed, ease of use, and context-awareness, such as those disclosed in commonly assigned U.S. Pat. No. 12,260,774, the entirety of which is incorporated by reference.

Many conventional BCI systems are limited because the generation of a signal is usually limited to a few commands or a single command to control the BCI system, which can also require significant effort on the part of the user. Therefore, conventional BCI systems often require a user to significantly interact with the BCI system to communicate with others. Such increased interaction can cause user fatigue, ultimately limiting the autonomy of the user. There remains a need to increase the ability of a BCI user to communicate using the BCI system in a manner that reduces effort by the user while increasing the personalization of the system for the user. The systems and methods described herein together reduce the cognitive load typically associated with BCI communication interfaces, thereby mitigating fatigue as well as delivering more authentic and contextually relevant outputs.

SUMMARY OF THE INVENTION

The present disclosure includes a number of systems and methods for assisting an individual user ("individual") in using electronic-assisted communication. Such assistance can increase the speed of communication, reduce user fatigue, and/or provide personalization so that the electronic-assisted communication is a closer representation of the user as compared to traditional electronic voice generators or electronic communication devices. The methods and systems described herein can also benefit systems that allow a user to generate a large number of electrical signals since the methods and systems described herein can increase the speed at which a user interacts with the system and also allow for applying any given signal to multiple commands in the system.

The systems and methods described herein also enable the individual to communicate their own thoughts at a natural speed and authentically, such that the communication can optionally reflect the individual as a person, the individual's history, the individual's mannerisms, etc. The systems and methods described herein allow the individual to construct messages in a manner that flows naturally and continues the conversation at a relatively normal pace or close to normal pace instead of constructing a response that contains unnatural pauses.

Variations of the present disclosure include methods of enabling an individual to use an electronic device through a brain-computer interface that produces a digital motor output upon receiving an intentional brain signal from the individual. In one variation, the method includes: providing an electronic device having an electronic user interface and a processor, where the electronic device is configured to access a user database containing a plurality of data associated with the individual; wherein the processor is configured to identify a set of suggested actions using the user database such that at least one suggested action is relevant to the individual, where the set of suggested actions is operable on the electronic device; displaying at least a plurality of the set of suggested actions on the electronic user interface in a stepwise order, such that the individual can select a selected action from the set of suggested actions using the digital motor output; and transmitting the selected action to the electronic device to interact with the electronic device.

Variations of the method can include a processor that is configured to identify the set of suggested actions using a first large language model operatively networked to the electronic device and configured to access the user database.

Variations of the present disclosure methods where the processor is configured to identify the set of suggested actions using a second large language model configured to access general knowledge.

Variations of the present disclosure include methods where at least one suggested action from the set of suggested actions includes a letter or a number.

Variations of the present disclosure include methods where at least one suggested action from the set of suggested actions includes a series of letters.

Variations of the present disclosure include methods where at least one suggested action from the set of suggested actions includes at least one word.

Variations of the present disclosure include methods where at least one suggested action from the set of suggested actions includes a website hyperlink.

Variations of the present disclosure include a method, further including obtaining a plurality of contextual data associated with the individual, wherein the processor is further configured to identify the set of suggested actions using the plurality of contextual data.

Variations of the present disclosure include methods where displaying at least the plurality of the set of suggested actions on the electronic user interface in a stepwise order includes cycling through the set of suggested actions in a rolodex-type configuration.

Variations of the present disclosure include methods where displaying at least the plurality of the set of suggested actions on the electronic user interface in the stepwise order includes sequentially displaying the set of suggested actions.

Variations of the present disclosure include methods where displaying at least the plurality of the set of suggested actions on the electronic user interface in the stepwise order includes moving a cursor over the set of suggested actions.

Variations of the present disclosure include methods where the individual can select the selected action when the cursor is near the selected action on the electronic user interface.

Variations of the present disclosure include methods where the set of suggested actions includes a set of hyperlinks, and wherein displaying at least the plurality of the set of suggested actions on the electronic user interface in the stepwise order includes sequentially highlighting the set of hyperlinks.

Variations of the present disclosure include a method of enabling an individual to use an electronic device through a brain-computer interface that produces a digital motor output upon receiving an intentional brain signal from the individual, the method including: analyzing a user database, where the user database includes a plurality of data associated with the individual; identifying a set of suggested actions using the user database such that at least one suggested action is relevant to the individual, where the set of suggested actions are operable on the electronic device; displaying, on an electronic user interface, the set of suggested actions in a stepwise order such that the individual is able to select a selected action from the set of suggested actions using the digital motor output; transmitting the selected action to the electronic device to interact with the electronic device.

Variations of the present disclosure include methods of identifying the set of suggested actions using the user database such that at least one suggested action is relevant to the individual, and using a first large language model operatively networked to access the user database.

Variations of the present disclosure include methods where identifying the set of suggested actions further includes using a second large language model configured to access general knowledge.

Variations of the present disclosure include methods where at least one suggested action from the set of suggested actions includes a letter or a number.

Variations of the present disclosure include methods where at least one suggested action from the set of suggested actions includes a series of letters.

Variations of the present disclosure include methods where at least one suggested action from the set of suggested actions includes at least one word.

Variations of the present disclosure include methods where at least one suggested action from the set of suggested actions includes a website hyperlink.

Variations of the present disclosure include a method, further including obtaining a plurality of contextual data associated with the individual, and wherein identifying the set of suggested actions includes using the plurality of contextual data.

Variations of the present disclosure include methods where displaying the set of suggested actions on the electronic user interface in a stepwise order includes cycling through the set of suggested actions in a rolodex-type configuration.

Variations of the present disclosure include methods where displaying the set of suggested actions on the electronic user interface in the stepwise order includes sequentially displaying the set of suggested actions.

Variations of the present disclosure include methods where displaying the set of suggested actions on the electronic user interface in the stepwise order includes moving a cursor over the set of suggested actions.

Variations of the present disclosure include methods where the individual can select the selected action when the cursor is near the selected action on the electronic user interface.

Variations of the present disclosure include methods where the set of suggested actions includes a set of hyperlinks, and wherein the set of suggested actions on the electronic user interface in the stepwise order includes sequentially highlighting the set of hyperlinks.

Variations of the present disclosure include a method of facilitating electronic-assisted communication for an individual to respond to an input communication, the method including: providing an electronic assistance device that is in communication with a user database containing a plurality of information associated with the individual; building a first set of suggested response words using a processor configured to: i) select a plurality of response words that are associated with the individual using the user database; and ii) select the plurality of response words that are conversationally relevant to the input communication; displaying the first set of suggested response words on the electronic assistance device; constructing a response phrase by selecting a first response word from the first set of suggested response words; selecting one or more sequential sets of suggested response words using the processor to identify words that are contextually related to the partial response; displaying the one or more sequential set of suggested response words on the electronic assistance device; altering the response phrase by selecting a subsequent response word from each of the one or more sequential set of suggested response words and adding the subsequent response word to the response phrase; and electronically transmitting the response phrase to an external device using the electronic assistance device.

Variations of the present disclosure include methods where displaying the first set of suggested response words on the electronic assistance device includes individually actively displaying each suggested response word from the first set of suggested response words.

Variations of the present disclosure include a method of facilitating electronic-assisted communication for an individual to respond to an input communication, the method including: providing an electronic assistance device that is in communication with a user database containing a data associated with the individual; displaying one or more suggested response words on the electronic assistance device where the one or more suggested response words are selected by a processor in communication with the electronic assistance device and configured to: i) select words that are associated with the individual using the user database; and ii) select words that are conversationally relevant to the input communication; constructing a partial response by selecting one or more response words from the one or more suggested response words; displaying one or more suggested response phrases on the electronic assistance device, where the processor is configured to generate the one or more suggested response phrases using phrases that are contextually related to the partial response and phrases that are associated with the data associated with the individual; selecting a response phrase from the one or more suggested response phrases and electronically transmitting the response phrase to an external device using the electronic assistance device.

Variations of the present disclosure include methods where displaying one or more suggested response words on the electronic assistance device includes individually actively displaying each suggested response word from the one or more suggested response words.

Variations of the present disclosure include a method of facilitating electronic-assisted communication for an individual to respond to an input communication, the method including: providing an electronic assistance device that is in communication with a user database containing a plurality of information associated with the individual; building a set of suggested response phrases using a processor configured to: i) select phrases that are associated with the individual using the user database; and ii) select phrases that are conversationally relevant to the input communication; displaying the set of suggested response phrases on the electronic assistance device; and selecting a response phrase from the set of suggested response phrases and electronically transmitting the response phrase to an external device using the electronic assistance device.

Variations of the present disclosure include methods where displaying the set of suggested response phrases on the electronic assistance device includes individually actively displaying each suggested response phrase from the set of suggested response phrases.

DETAILED DESCRIPTION

The following relates to the use of generative content to improve electronic communication assistance to individuals suffering from full or partial paralysis, disabilities, or other muscular disorders that impair conventional verbal communication.

Generative artificial intelligence (AI), specifically language models including large language models (LLMs), continues to improve in their capabilities. These models demonstrate a strong understanding of language in context, structure, and semantics.

The systems and methods described herein harness the use of AI and LLMs to generate faster communication and typing than would otherwise be the case for people who use electronic-assisted communication devices or systems. While the examples discussed herein include users of BCI systems, and are particularly helpful to people with upper limb paralysis, the generative content can be applied to any electronic assistance device, such as a portable digital device (e.g., electronic tablets, smartphones, etc.) as well as computers or other similar electronic human interface devices that would support an individual using electronic-assisted communication. Electronic assistance device 100 can comprise any device, including but not limited to a brain-computer interface, a portable digital device (electronic tablets, smartphones, personal devices, smart watches, virtual reality headsets/eyewear, etc., and/or a computer).

Figure 1A:
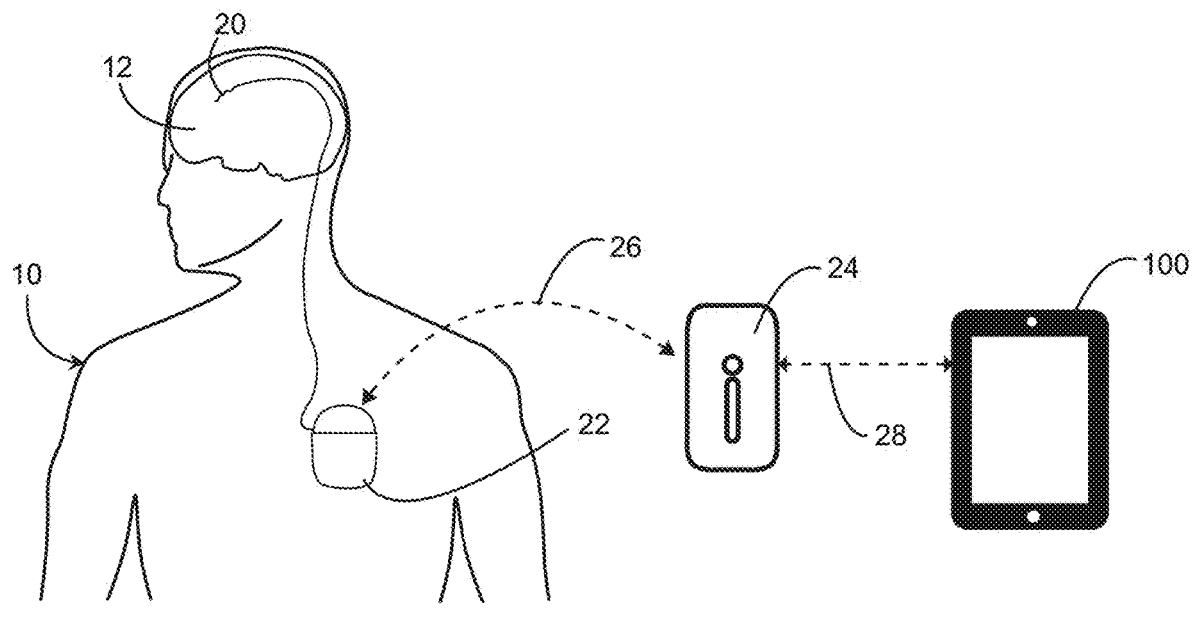
FIG. 1A illustrates an individual accessing a user interface through a BCI.
Figure 1B:
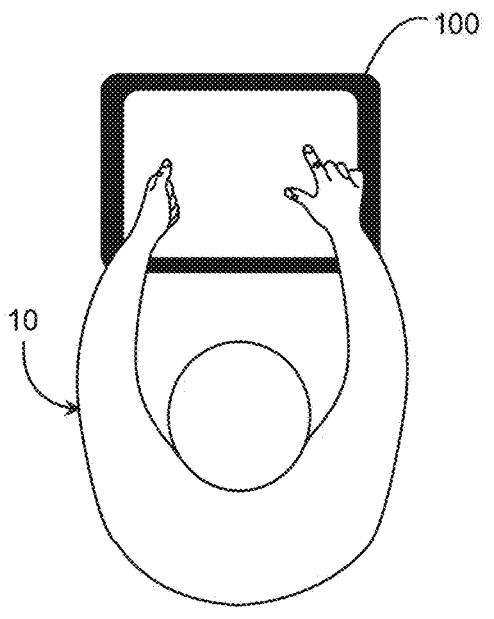
FIG. 1B shows an individual directly accessing a user interface.

FIG. 1A illustrates an example of an individual 10 using a BCI system that includes one or more electrodes 20 that detect neural signals from the individual 10 that are transmitted 26 by one or more components 22, 24 to ultimately connect 28 with an electronic device 100, which can also be an electronic assistive device having a user interface. While FIG. 1B illustrates the electrode 20 implanted within the individual 10. The generative content concepts can be applied to any type of BCI, including surgically implanted electrodes, electrodes that are positioned exterior to the body, including in an earphone, electrodes that are directly implanted in brain tissue, and/or electrodes that are placed over tissue within the skull, etc. In addition, as shown in FIG. 1B, the concepts disclosed herein can be accessed directly on a user interface by an individual 10 either in combination with a BCI or apart from a BCI.

FIG. 2 is an example representation of schematics 50 of an electronic assistance device 100 employing the generative content methods and systems to increase the ability of the user to interact in a manner that reflects the user's personality and/or behavioral aspects as described herein. The electronic assistance device 100 can function as a communication device or as a control device that interacts with alternate electronic devices. For example, the user can instruct the electronic assistance device 100 to generate the communication as an audible voice message. Alternatively, or in combination, the electronic assistance device 100 can couple to another electronic device (e.g., those devices described above) and deliver the communication electronically, either by text or an audible voice message.

Figure 2A:
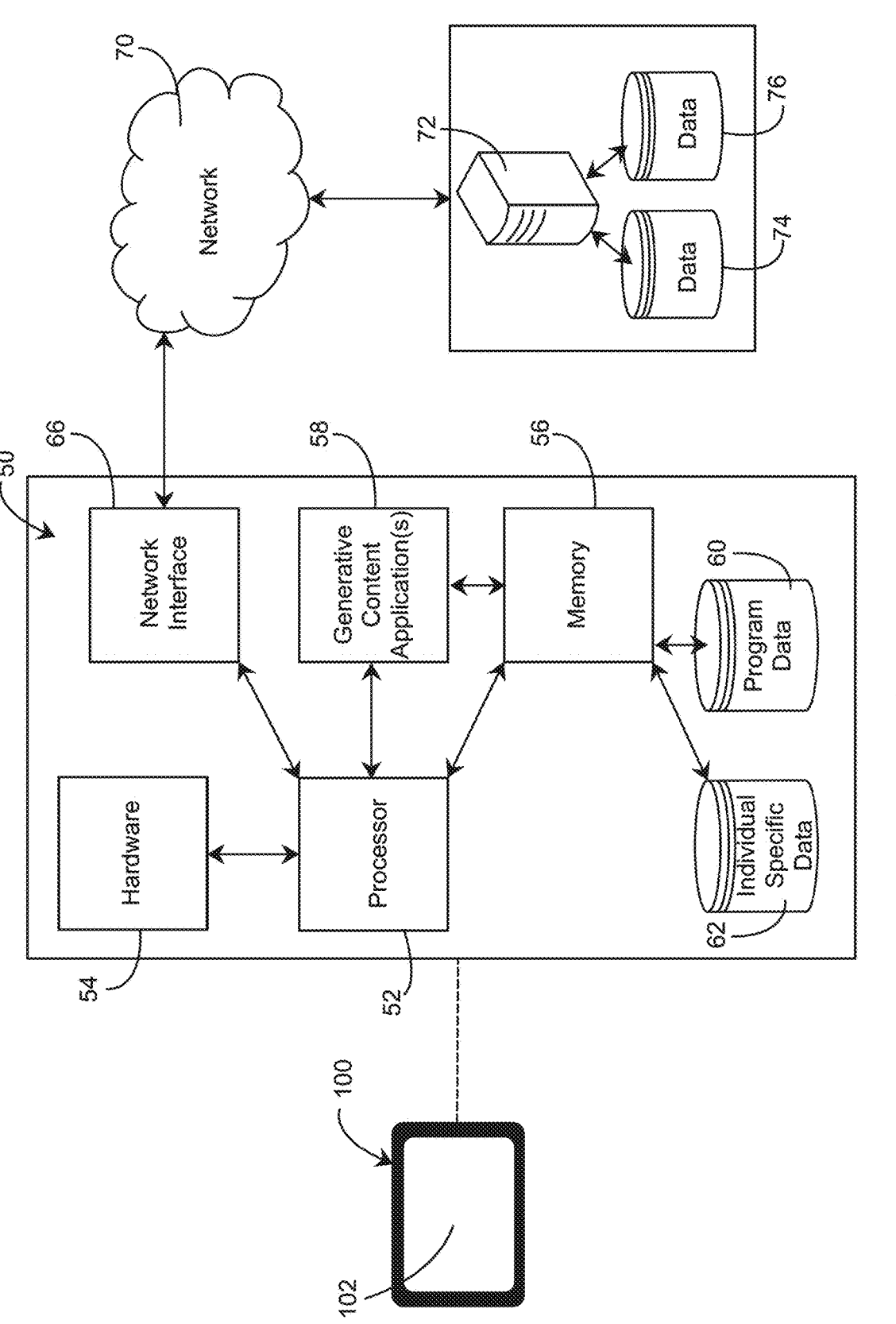
FIG. 2A is a representation of an example schematic of an electronic assistance device employing the generative content.

FIG. 2A also shows the example system 50 as having a processor 52, hardware 54, memory 56, and an optional network interface 70. The hardware 54 can include microphones, speakers, display units, and other items that are common to electronic human interface devices or electronic assistance devices, as described above. The system can include one or more generative content applications 58 that generate messages responsive to an input, as described below. The system can also optionally include databases 60 62 that are stored locally on the system. Alternatively, or in combination, the system can rely on a network connection 70 to access remote servers 72 to access additional databases 74, 76, including personal data that can be stored remotely. While the databases 74, 76 in FIG. 2A are depicted as being accessible through a cloud network connection; the databases can also be stored locally or work in combination with remote and local storage. In the variation shown in FIG. 2A, the electronic assistance device 100 is shown as being connected to the system 50. However, the system 50, and/or the databases, can be contained (entirely or one or more components) in the hardware of the device 100. Alternatively, the electronic assistance device 100 can comprise a screen or interface 102 for the individual to engage the system 50.

Figure 3A:
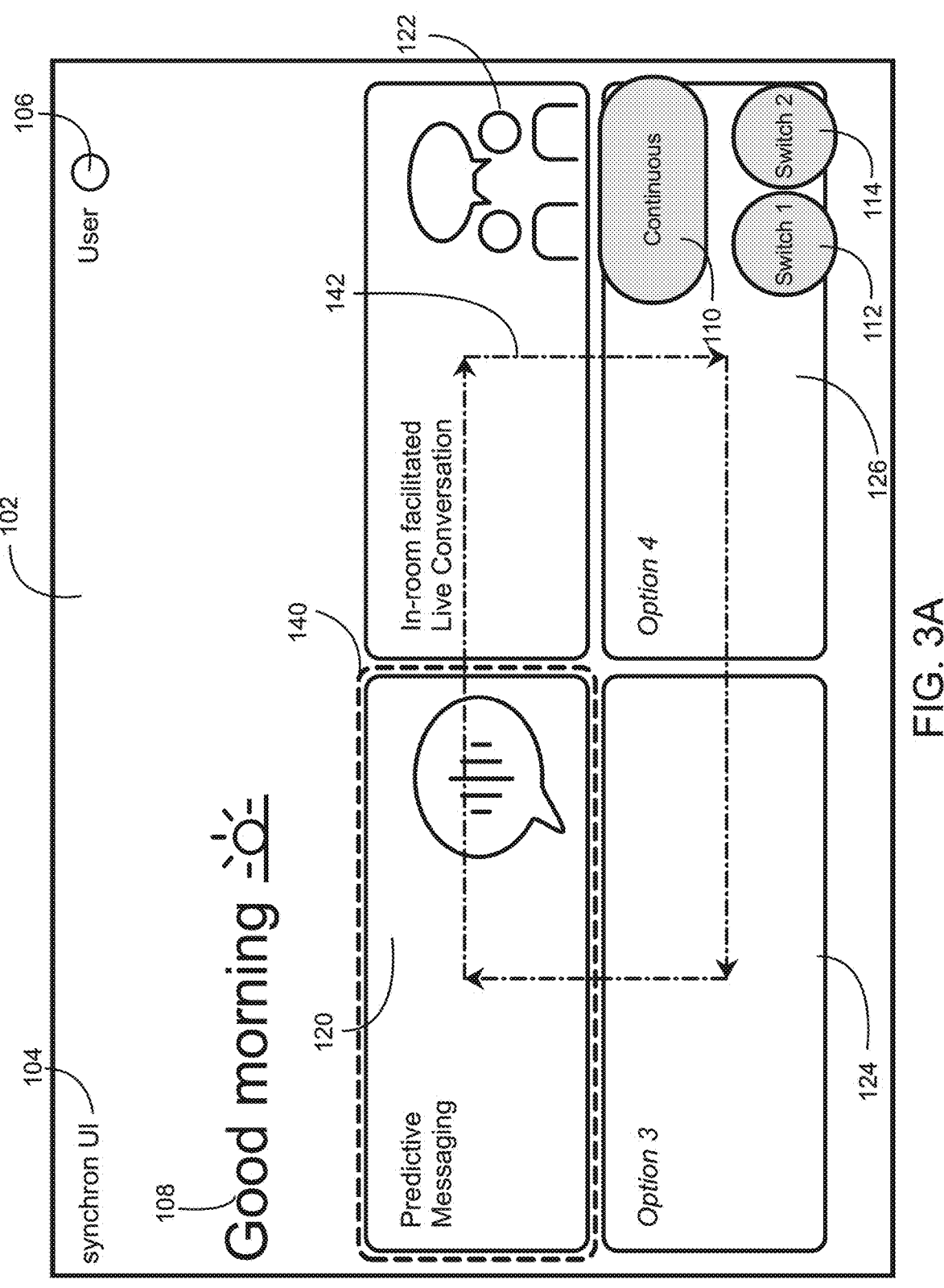
FIG. 3A illustrates one example of a user interface displayed on an electronic-assisted communication device.

FIG. 3 illustrates one example of a user interface 102 displayed on an electronic-assisted communication device 100 (not shown in FIG. 3). The interface 102 can include information identifying the user 106 (confirming that the appropriate personal databases are connected to the system), system identification information 104, and any system communication messages 108.

Figure 2B:
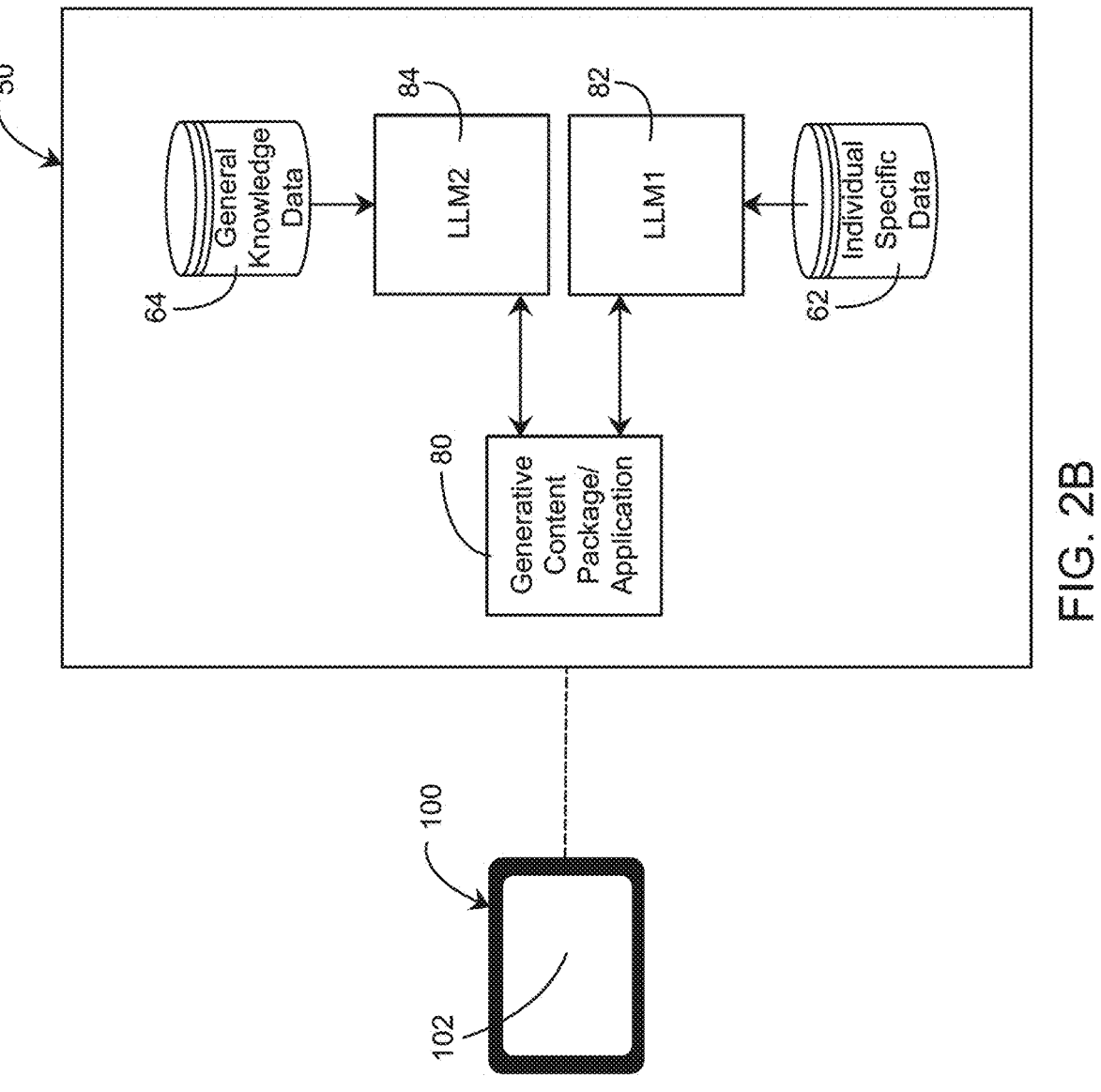
FIG. 2B illustrates a variation of a configuration of the system described herein that provides generative content for a user of the BCI using at least two large language models.

FIG. 2B illustrates a variation of a configuration of the system 50 described herein that provides generative content for a user of the BCI. In this variation, the generative content package or application relies on two or more LLMs 82, 84. One LLM 82 is focused on data specific to the individual user 62. Another LLM 84 can be used for anything that is related to general knowledge. As an example, LLM 82 can determine information specific to the user (e.g., a schedule) and combine that information with general knowledge data (e.g., the local weather) to provide one or more personalized generative packages that allow the user to navigate the user interface 102 of the electronic device with increased efficiency. In one example, the suggested action can comprise a phrase having a portion that is based on the user's generative content and another portion based on general knowledge data.

As noted above, the systems and methods described herein are especially useful, but not limited to, where a user of an electronic-assisted communication device 100 is limited to providing a few or limited commands to trigger an input. In the example of a BCI, the user could be limited in the amount of neural signals or intents (i.e., thoughts generated by the user) that provide a consistent electronic signal that is associated with those intents to trigger respective electronic commands or switches (i.e., the electronic signal generated by an intentional neural thought using the BCI).

The systems and methods described herein allow for a number of processes to achieve personalization of response, enhanced speed of interaction, increased ease of use, and context-awareness. Such processes include, but are not limited to: (1) a switch-based scanning UI that dynamically adapts to context, (2) a sequential "rolodex-style" input interface integrating predictive text, and (3) conversational memory personalization using the user's history and context to tailor suggestions. In addition, the systems described herein can provide the user with contextually relevant prompts based on time of day, the user's routine, or other behavioral patterns. For example, the system can provide commands that are appropriate during the morning, and other commands that are appropriate during the evening or other parts of the day.

Switch-based scanning can be implemented to let the BCI user navigate UIs by sending directional commands (e.g., forward/back, up/down) that cycle through on-screen options. As noted above, the BCI translates neural signals into a DMO, and a controller module applies that DMO to an interaction method. The Controller can seamlessly switch control between a proprietary app, such as a personal host application (PHA), and standard operating interfaces (e.g., Android, IOS, variations of Android/iOS, open source operating systems, etc.) through a UI. Accordingly, a BCI can operate the operating system (e.g., iOS Switch Control) natively or using a custom UI. For example, when controlling third-party apps, the system enters iOS's native switch scanning mode, sending a rapid sequence of "move next" signals from the BCI to mimic auto-scanning. Internally, the BCI repeatedly issues "forward" commands to create the illusion of the UI auto-scanning on its own. This strategy compensates for any neural signal jitter and ensures smooth highlighting progression. When switching to the proprietary communication app, a custom scanning paradigm is used with richer context exchange. The system constantly knows the UI context and can adjust scanning behaviour accordingly.

In the example shown in FIG. 3, a user interface 102 is designed in a way that a limited number of electronic switches (i.e., the electronic signal generated by an intentional neural thought) can produce a greater number of actions or commands in the system. In the illustrated example, the user interface 102 shows three switches, 110, 112, 114, respectively identified as "continuous", "switch 1", and "switch 2". Again, the number of switches can range from 1 to N, where N will be defined by the system and the individual's ability to repeatably generate neural activity that produces a specific electronic signal. In the examples discussed herein, a single switch, e.g., 112, is used to select an option/application. While switch 2 114 can be used to produce a menu. The continuous switch 110 is discussed below. While the user interface 102 is shown in FIG. 3 is a personalized user interface; similar applications can be used with the commercial operating systems discussed above.

The user interface 102 shown in FIG. 3 also shows 4 applications or options 120, 122, 124, 126 for engaging the electronic-assisted communication device. Again, the number of options shown is not intended to be limiting, only exemplary to demonstrate the concepts of the inventive user interface. The user interface 102 is configured such that one of the plurality of options 120, 122, 124, 126 is actively displayed. Actively displayed in this example means that the user can identify the option that would be selected upon triggering an associated switch during the time in which that option is active. In the illustration, option 120 is identified as being actively displayed using the active indicator 140, which surrounds option 120. In this illustration, the active indicator 140 is a dashed line. However, alternatively or in combination, the active indicator can be a color or other feature (such as using larger or bolded font) that distinguishes an actively displayed option from the remaining options (e.g., a color outlining the box, or filling the box with a unique color, by greying out the non-active options, or by any other means that communicates to the individual the option that the actively displayed will be triggered the time that the active indicator aligns with that option). In those examples where the user is using a web browser (or other application allowing for accessing websites, the options can comprise various links. The user interface can cycle between making various links the active link. These links can be selectively identified due to personalization as the system draws from information specific to that user (e.g., the user's habits, favorite sites, sites more relevant due to the context associated with the user, etc.) Alternatively, the user interface can cycle each link as the active link.

FIG. 3 also shows a representation of how actively displaying the option is dynamic or scalar. As shown, the active indicator 140 will scan/move over a path 142 at a velocity (either constant, varied, increasing, or decreasing) such that each option 120, 122, 124, or 126 is actively displayed as an active option by the active indicator 140. In the illustrated variation, the active indicator 140 can move about the path 142 in a single direction, or it can reverse directions upon completion of the cycle or upon the user triggering one or more switches. The path 142 is shown as representing a polygonal shape. However, any path is within the scope of this disclosure as long as the path repeatedly identifies each of the available options as being actively displayed.

The combination of actively displaying a series of options allows a single switch to select any number of options that will eventually be actively displayed. In the example of FIG. 3, each switch 110, 112, 114 can be applied to each application/option 120, 122, 124, 126 by actively displaying each option sequentially. This provides an individual the ability to use a single neural command for multiple purposes. The use of the active display 140 moving over a path 142 is similar to a (n electronic) "rolodex" operation where the individual can focus on the active option (i.e., the one identified by the active indicator), where the active option changes over time.

The scanning UI can dynamically adapt to the screen content and user's context (as described in commonly assigned U.S. Patent publication no. US20250138635, the entirety of which is incorporated by reference). For instance, on a video app home page, the primary controls might be navigation and selection of videos, whereas once a video is playing, the controls should automatically shift to media functions (pause, comment, thumbs-up). In such cases, the set of actions scanned through is adaptive to the active application or screen state. This goes beyond traditional static scanning menus by using the application context to present only relevant actions at a given time. In one variation, the switches adapt to the screen such that the options scanned over change from YouTube's browse page versus the video player screen. This context-dependent scanning can be further refined by leveraging AI: the system can use generative models to highlight or prioritize relevant UI elements.

Figure 3B:
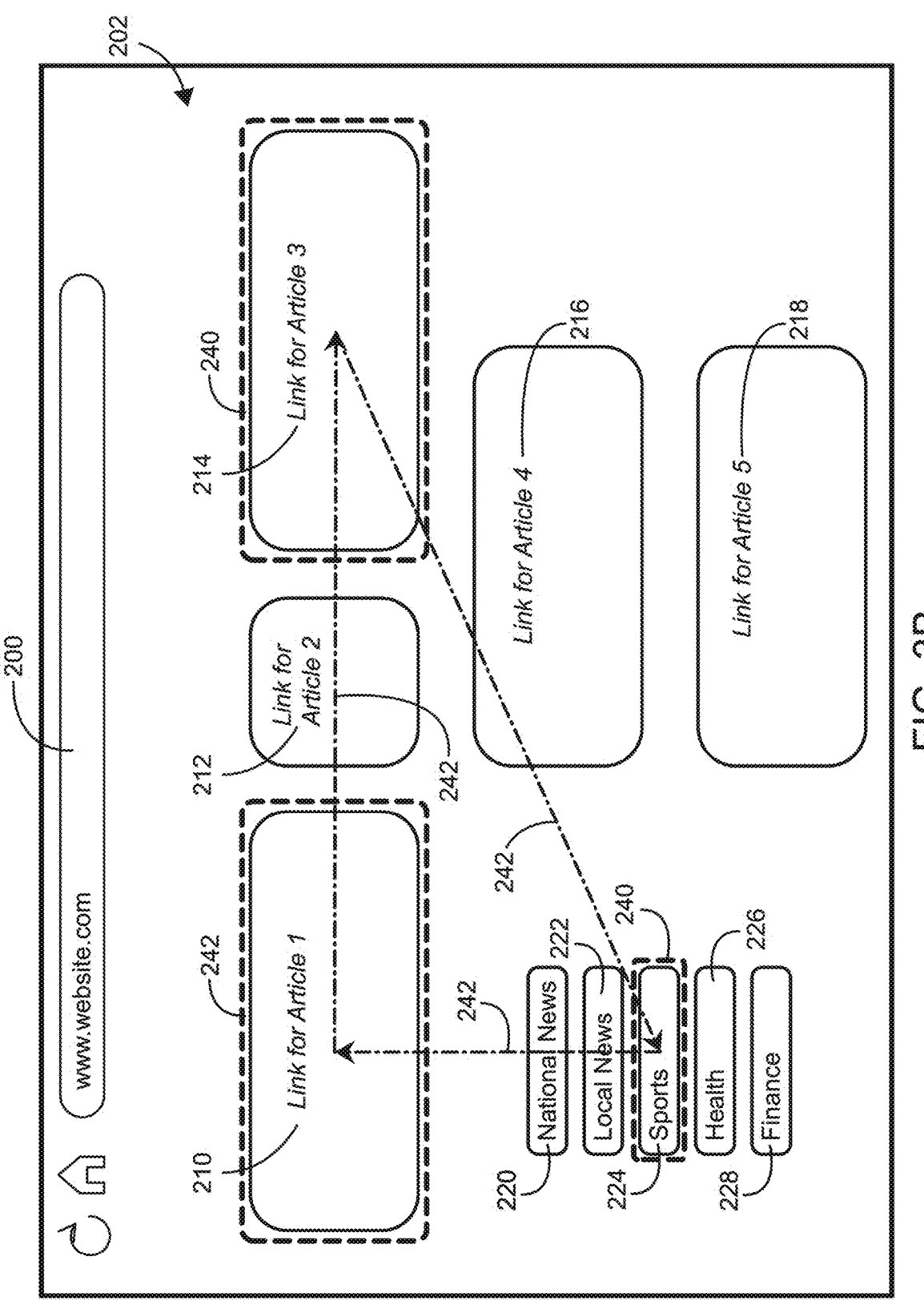
FIG. 3B shows a user interface 202 that is overlaid or integrated with a web browser.

In another example, as shown in FIG. 3B, a user interface 202 can be overlaid or integrated with a web browser 200. In such a case, in the interface 202 could intelligently highlight links relevant to the user's context (e.g., based on past interests or the current task). For example, as shown in FIG. 3B, the browser 200 can display any number of links, e.g., 210-228), but the interface 202 can use generative AI to identify context associated with the user, or personal information, to highlight 240 selective links that may be of increased interest to the user. As such, the interface 202 can cycle through these links, e.g., using an indicator that moves over a path 242, or where the highlight 242 sequentially moves over the links of interest to speed interaction with the user. In the illustrated figure, the interface 202 cycles through highlighted 240 links 210, 214, and 224. However, any combination of links can be identified and cycled through. In addition, the user will have the ability for the user interface 202 to cycle through all of the links or links that are selected by the user. FIG. 3B shows a variation of the user interface 202 that does not include specific switches (see 112, 114 in FIG. 3A). In such a case, the DMO simply provides a mouse click/selection when the link of interest is sequentially highlighted or identified by an indicator. In the variation shown in FIG. 3B, the links of interest are suggested actions for the individual to consider and are selected based on data specific to the individual (as discussed herein).

An example of context data or contextual data can include the type of application being used, and information about where and how the patient is using the system. This "context" may include the activity in which the user is engaging, such as typing, using social media, engaging with a "tiled" graphic user interface, browsing through an internet browser, interacting with a mixed-reality headset, navigating a map, watching a video, or engaging in a computer game. The context can also include environmental factors like time, temperature, lighting, ambient noise, etc.; external physiological data like heart rate available as part of any commercial health ecosystem or other similar systems. Given the context, the system can select a suggested action based on this information or a variety of information.

Different algorithms have different characteristics. For example, asynchronous switch algorithms make predictions on a quasi-continuous basis (e.g., one prediction every 100 ms). This contrasts with synchronous switch algorithms, which make predictions on timescales that users can aptly respond to (e.g., 2-4 seconds). Therefore, asynchronous algorithms tend to have a higher likelihood of producing false positives than synchronous algorithms. A contextually aware system may wish to change to a more accurate yet slower synchronous decoder when potentially eliciting high-consequence application state changes (e.g., sending an email).

This Generative AI-driven highlighting guides the scanning focus to likely targets, speeding up navigation. Additionally, the scanning mechanism is made more forgiving: when the user's control, such as a movable cursor or highlight or scanner, lands near a target, smart logic can register it as a hit even if not perfectly on the link. Quantifying "near a target," which is the distance between the cursor and the target location for a click, can be defined and managed by the BCI system. Optionally, the range is between 0.2 mm and 5 cm, but larger or smaller ranges are within the scope of this disclosure. This tolerance for "close-enough" selection greatly improves usability for motor-impaired users who might have difficulty timing the switch exactly. Together, these innovations in scanning UI, context-aware option sets, AI-prioritized targets, and tolerant selection can significantly improve navigation speed and accuracy over conventional single-switch scanning. Importantly, the adaptive scanning interface works in concert with multiple input modes, making it a robust universal interface layer for different apps and contexts.

Figure 4A:
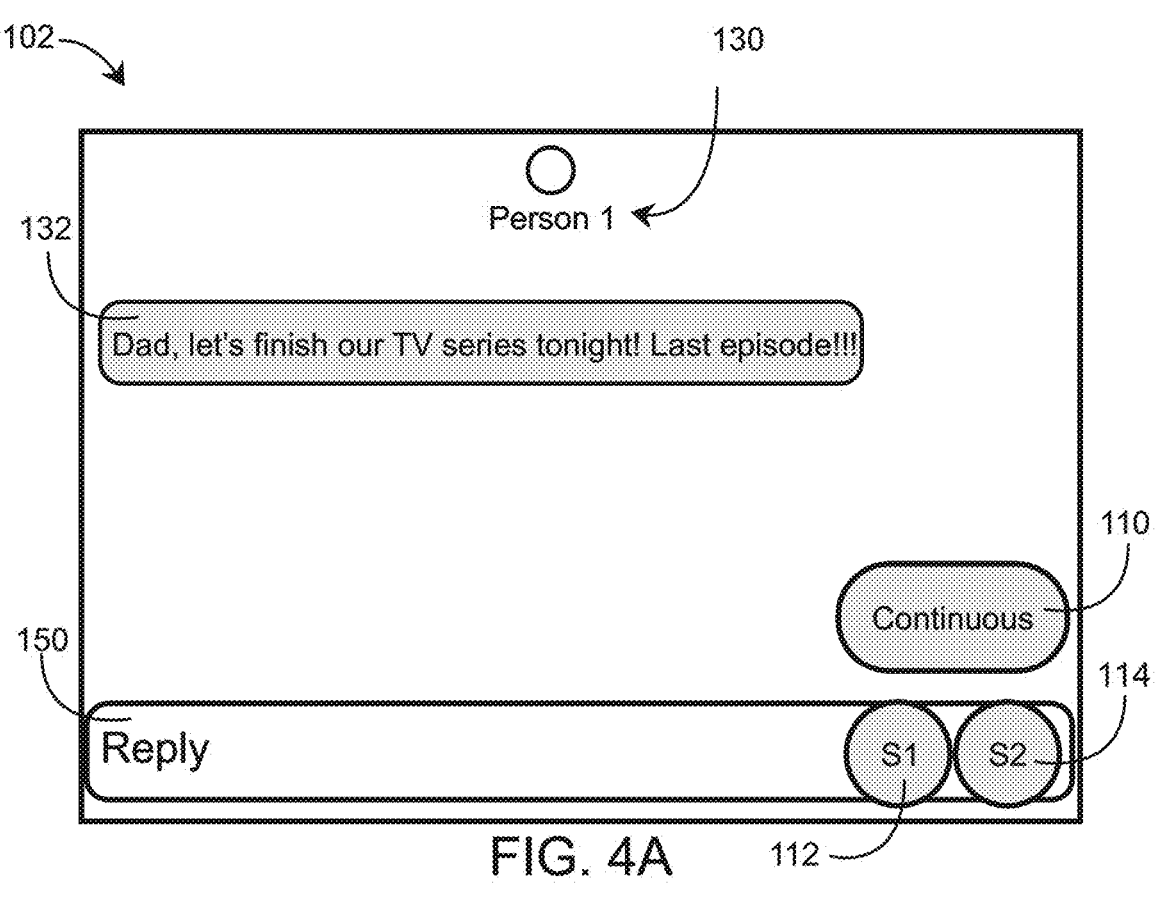
FIGS. 4A to 4J illustrate an example of a sequentially active display being applied to a predictive messaging application using a moving active indicator (i.e., a rolodex-type presentation) for electronic-assisted communication.

FIGS. 4A to 4J illustrate an example of a sequentially active display being applied to a predictive messaging application using a moving active indicator (i.e., a rolodex-type presentation) for electronic-assisted communication. FIG. 4A shows the user interface 102 after option 120 from FIG. 3 is selected by the individual. In this example, the individual enters a messaging application that is configured to produce predictive content to increase the speed of communication by the individual. The predictive content, in combination with the active indicator selection, allows the individual to communicate authentic thoughts at an increased speed when compared to conventional text entry.

The integration of generative AI (large language models) is useful for generic word prediction, as well as a user's personal style and past conversations or personalization. Such conversational memory personalization allows the BCI to adapt mannerisms, tone, and history to be consistent with the user's mannerisms, tone, and history, and this allows the user to generate more authentic and personalized responses.

Personalization can be achieved by the BCI building a user-specific language model or profile that learns from the user's prior communications. For example, it learns common phrases the user likes, the formality or slang the user employs with different contacts, and any recurring topics or names. Using this, when the user is composing a new message, the AI suggestions are contextually relevant not only to the immediate conversation topic but also to the relationship or context of the person with whom the BCI user may be communicating. For instance, if a user frequently communicates to his/her caregiver, "I need to reposition now," the system may proactively suggest "I need to reposition now" once it detects the user might be headed that direction in a conversation. Or if the user greets the user's doctor differently than a family member, the AI can adapt the tone of suggested phrases accordingly. For instance, it is more formal and less casual. The generative content platform is disclosed in a commonly assigned U.S. Pat. No. 12,260,744, whereas a variation of the methods and systems described in the present includes application of generative content by adapting the generated content in reference to user-specific data and context associated with the user or system. By personalizing suggested words, phrases, responses, and other content, the system dramatically increases communication speed (fewer characters to input) while maintaining the user's authentic voice and, as such, is a personalized language model assistant tuned for the individual. This personalization can be further enhanced by the system recalling prior conversations with a specific person. By way of example, if the user last asked the user's physician about a medication, the next time the user communications with the user's physician, the AI might surface that topic as a quick suggestion. By way of further example, the system may prompt the user to query whether the medication has any side effects. Such context-dependent dialogue adaptation showcases the inventive synergy between memory personalization and the UI: the rolodex might show those personalized prompts at just the right moment, speeding up conversational turn-taking significantly.

Another example of personalization can be based on the user's browsing history. When the user browses web pages through the BCI, the system can employ generative AI to analyze the page and automatically highlight likely relevant interactive elements, such as HTML links, which would highlight to the user the next internet page or a particular news headline that matches the user's interests. By doing so, the scanning interface can skip irrelevant items and cycle through a shorter list of options that are most relevant to the user's context, thus accelerating selection.

Another embodiment addresses the cursor control precision: recognizing that BCI-driven cursors or dwell-based selection can be imprecise, the system implements a fuzzytarget selection algorithm (as mentioned earlier). If the user triggers a selection while the highlight or pointer is near a clickable item, the system will assume that item was intended and activate it. This improves accuracy without requiring perfect control, an inventive improvement over strict selection methods in existing switch control.

In the example shown in FIG. 4A, the user interface 102 shows a messaging screen that identifies the person or persons 130 in the electronic conversation. In the case of a BCI user, the user can also be identified by reference to an end-to-end encrypted channel with a PKI handshake. Variations of the predictive messaging can allow for the generated content to be dependent upon the person 130 engaged in the communication. For example, an individual's response will likely vary depending on whether the individual is a child, grandchild, partner, parent, professional colleague, friend, or caregiver. In such cases, an artificial intelligence model can draw from one or more databases containing individual-specific data to formulate a response where the authenticity of the response not only matches the individual's traits and characteristics, but also matches the individual's history with the person.

Figure 4B:
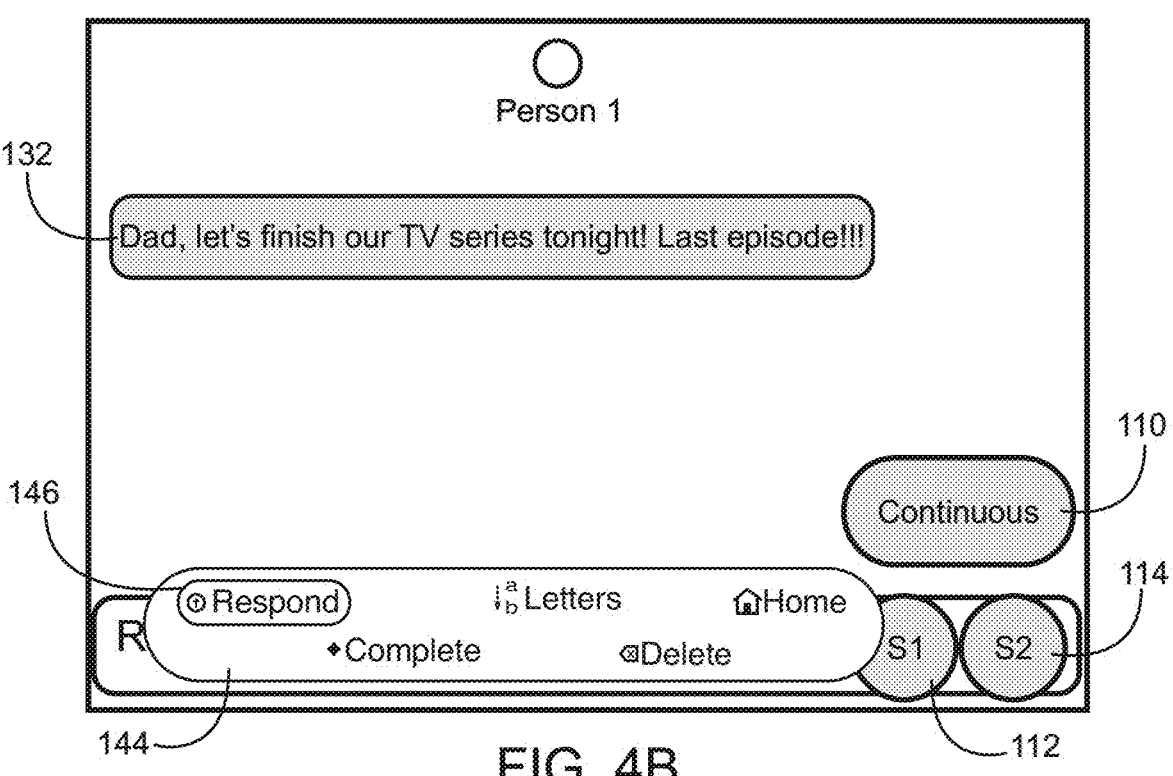

The user interface 102 messaging screen can also include a display of a communication 132 from the person 130. In variations of the systems and methods disclosed herein, this communication 132 can be considered an input communication 132 since the AI model can use this communication 132 as an input to the predictive communication output. The interface 102 also includes a reply window 150 that visually displays the communication phrase as it is constructed into a response. FIG. 4B illustrates an example where one switch, e.g., 114, is used to produce a menu of commands 144. As discussed above, the menu options can be actively displayed 146 in a sequential manner so that the individual can select the desired option as the active display 146 sequentially identifies various menu commands. For example, the individual can trigger the S2 switch 114 again or can actuate a different switch when the active indicator 146 shows a desired menu option.

Figure 4C:
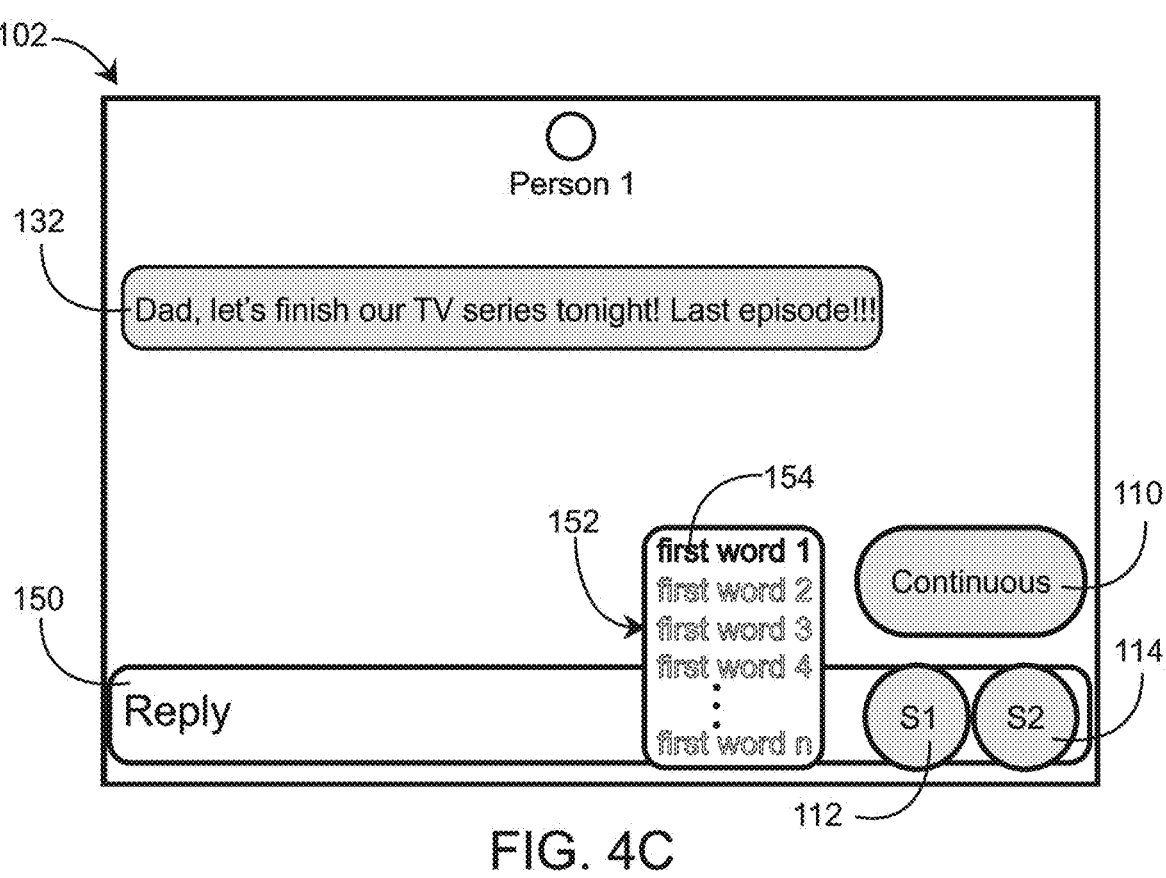

FIG. 4C shows a variation of the user interface 102 when the individual selects the "respond" menu command from FIG. 4B. The system and methods feed the AI model the input message 132, the person in the dialog, and various other information that is associated with the individual (e.g., using the database(s) described above, that are associated with communications (e.g., incoming message) that the individual receives, etc.). For example, the system can take into account the user's previous dialogue with the person, the user's profile, the tone of his/her voice, common words, and other information to provide an authentic dialogue for the individual. This personalized dialog can provide autonomy and independence for the individual while maintaining a personal connection with others previously had by the individual. As shown, the AI model returns a number of words in a rolodex form 152 that are conversationally relevant to the input message 132 and where at least one or more words are associated with the individual based on the discussion above. As shown, the words 152 can be presented in a cycling or rolodex form where the active indicator 154 cycles through the presented options. In this variation, the presented options are suggested actions that the individual can select. Presentation of the information in this form 152 provides additional benefits to the user. For example, one advantage is that the size of the presentation of choices 152 allows for a significant amount of information to be presented in a controlled size, which is more efficient than presenting the information in a grid with rows and columns.

The information can be provided in a single spot that allows for increasing the size of the text for increased visibility.

Figure 4D:
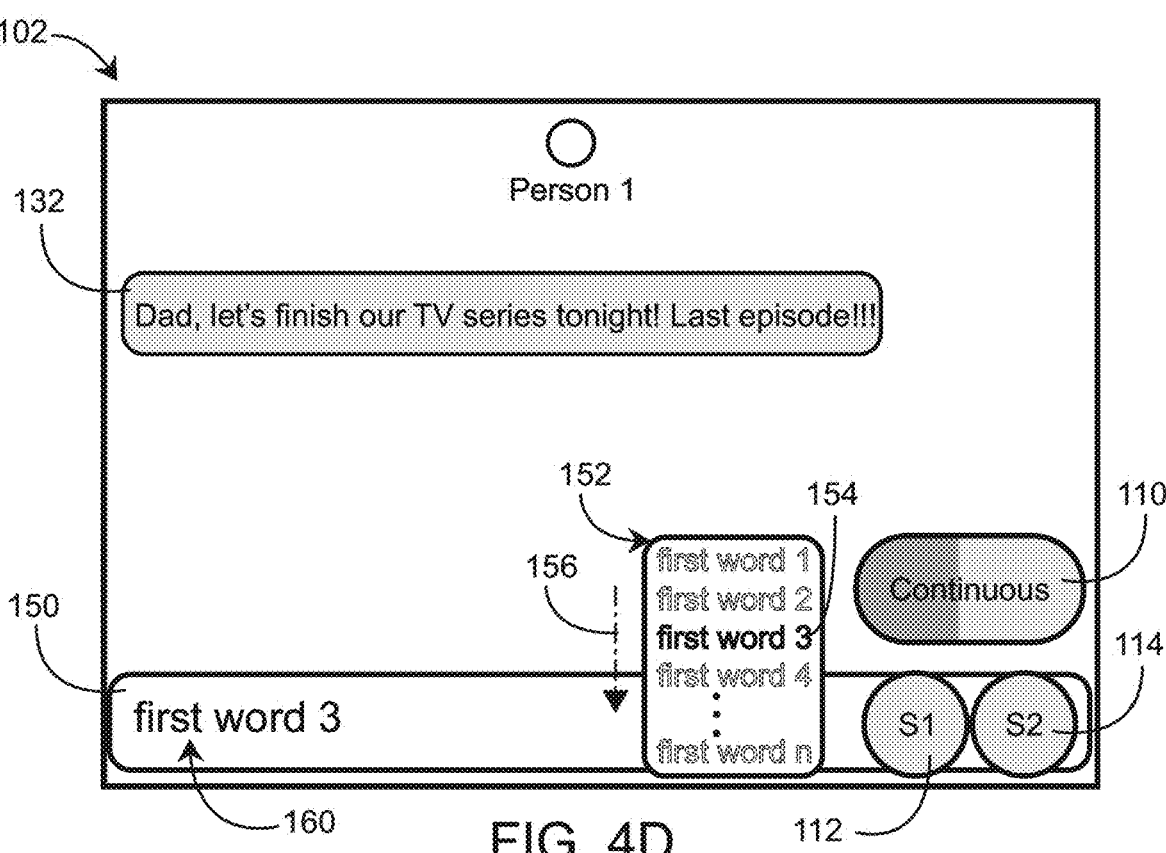

In one example, a single word is shown to be active 154 (in this variation, the "first word 1" is shown as active. In additional variations, as shown in FIG. 4D, the individual can select a switch (e.g., 110) that causes the active indicator 154 to become dynamic (as indicated by arrow 156) and cycle through the various word choices 152 in a stepwise manner. Meaning, that the system presents an opportunity for the individual to select the choice/suggested action 152 when the appropriate one is made active. For example, each choice 152 can move to the center of the list so that the active indicator 154 remains in the same place, but the word choices change in that indicator. Alternatively, the indicator can move over various word choices. As noted above, the indicator can be any visually distinguishable feature that identifies the active choice. Examples include graphics adjacent to or surrounding the active choice, colors, greying out the non-active choices, etc. In a variation of the systems and methods, the switch can also be animated (as shown in FIG. 4D). The individual can select the desired word choice once it is made active; in the illustration, "first word 3" is selected. This word is then used to construct a response phrase 160 that can be visually displayed in a response window.

Figures 4E, 4F:
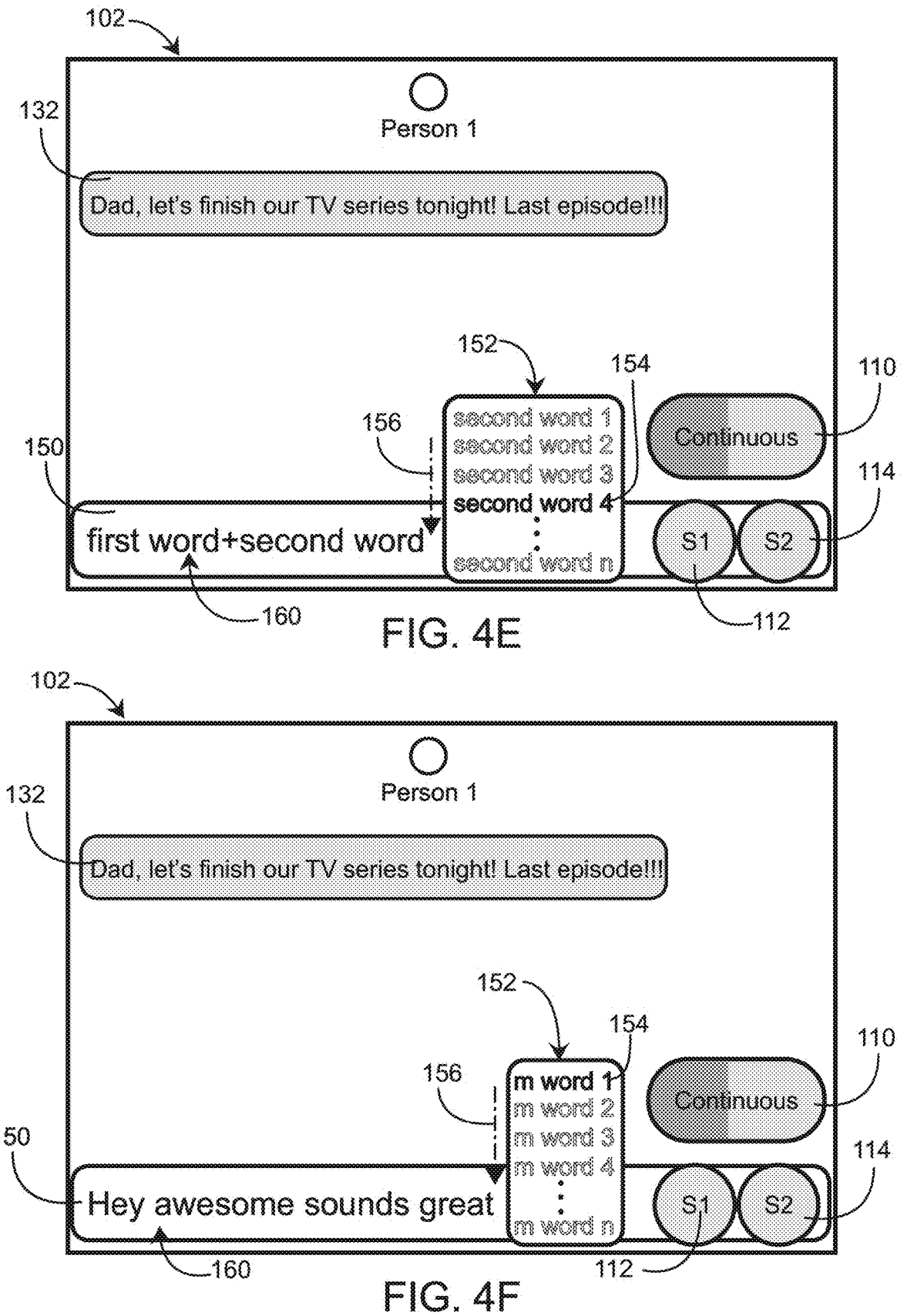
Figure 4G:
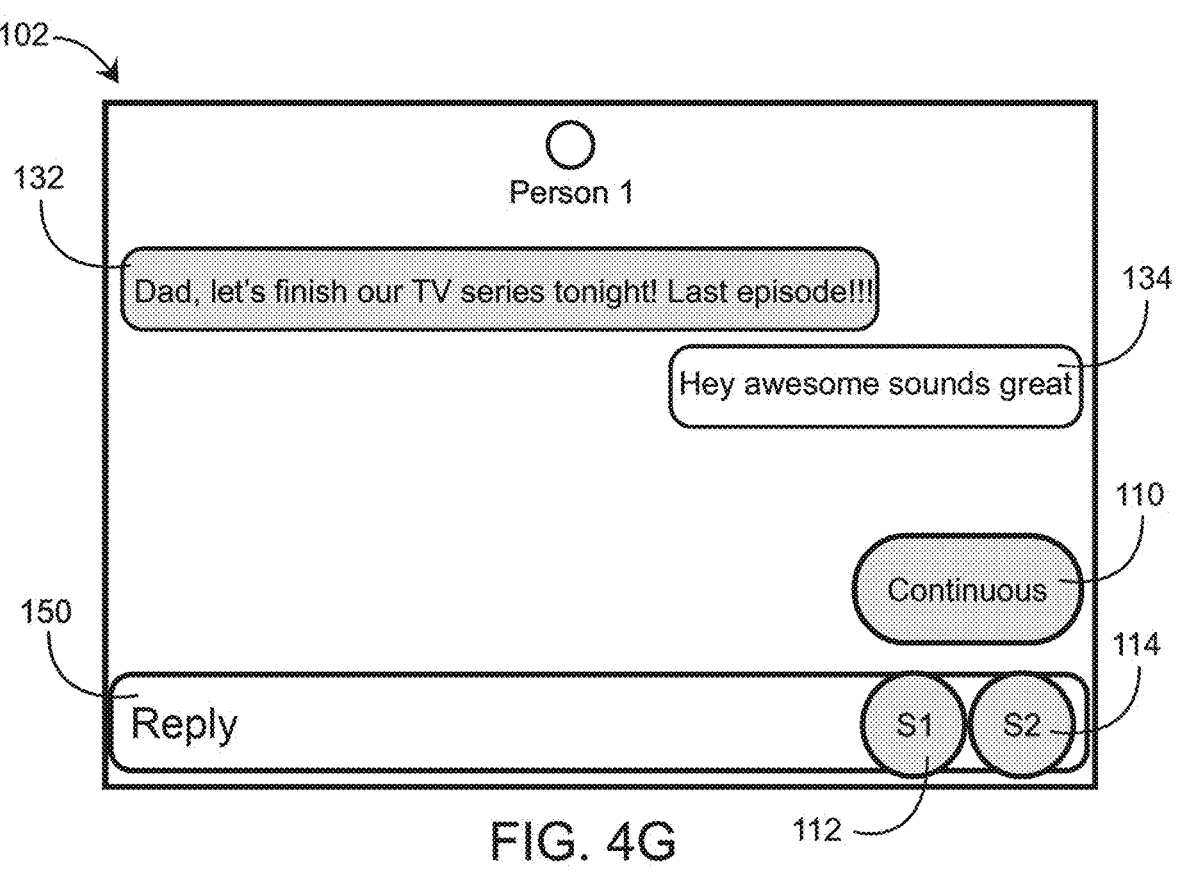

FIG. 4E shows a variation of the methods and system where the AI model produces sequential sets of suggested responses. The responses can be words 152, phrases, symbols, emojis, emoticons, or any other image/graphic used for communication. For convenience, the term words includes these examples, and the text word is used to identify a word formed from text characters. The words can be chosen as noted above. However, the additional words are also selected by the AI model to be contextually related to the previously selected word (or words). Again, the sequentially suggested words 152 can be dynamically presented such that the words are sequentially actively displayed 154. Once the user selects the word, the selected word is added to the reply phrase. In the variation shown in FIG. 4E, the constructed reply phrase 160 is shown in the reply window 150. However, the reply phrase can be shown with the subsequent words 152 or in any other manner. It is noted that the individual can have an option of the AI model completing the phrase using one or more selected words. Alternatively, as described below, the individual can simply generate a reply phrase without selecting each word.

FIG. 4F shows an example of a reply phrase 160 consisting of 4 words that were selected by the individual as described above. The interface 102 can optionally provide an additional subsequent set 152 of suggested words that the individual can either add to the phrase 160 or complete the phrase. In some variations, the individual can select a completion option from a menu or can simply transmit the phrase. Once transmitted, the reply phrase is sent to an external device (e.g., the person's cell phone, a voice generator, email, etc.)

Figure 4H:
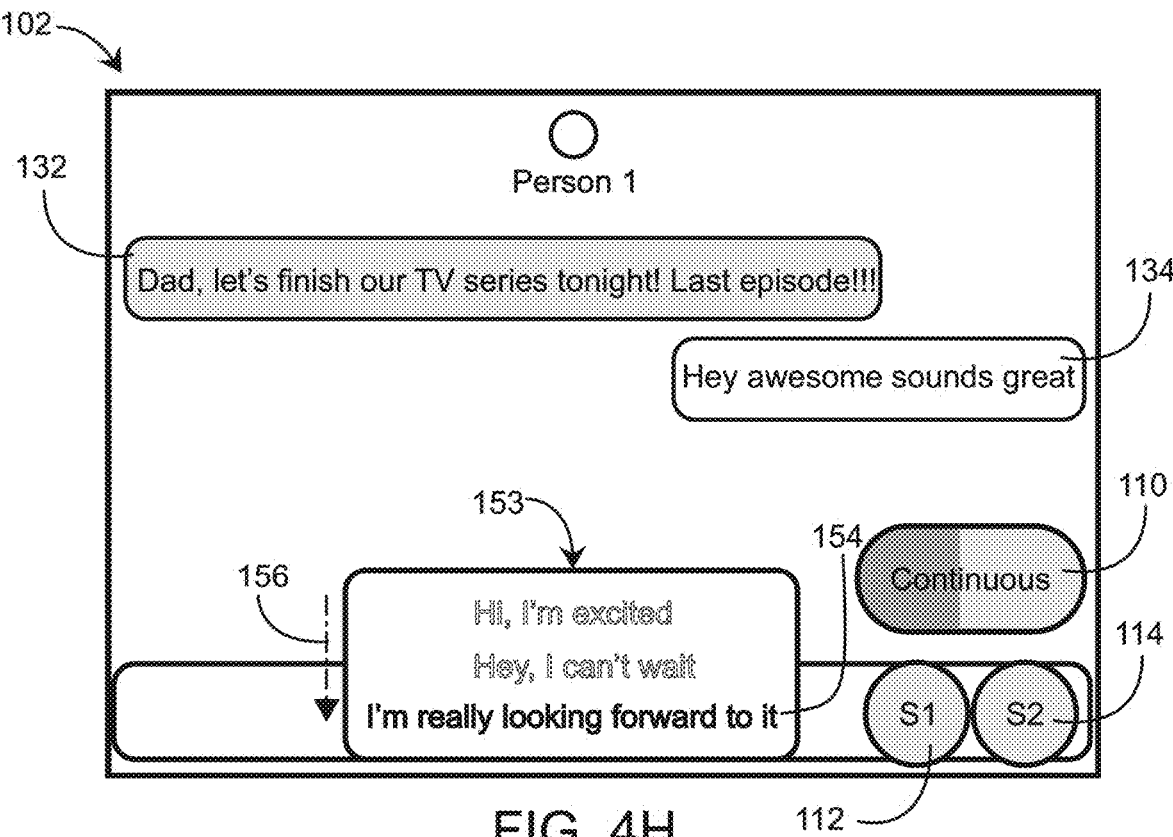

FIG. 4H illustrates a variation where the individual instructs the AI model to generate a series of complete phrases in a rolodex form 153. As noted above, the individual can trigger the series of complete phrases 153 using one or more previously selected words (where the full phrase was not completed), or the individual can trigger the series of complete phrases 153 without selecting any individual words. These phrases are considered suggested actions for the individual to select. FIG. 4H also illustrates that the AI model can generate phrases that are conversationally relevant to the input command 132, previous reply communications 134, as well as data specific to the individual, as discussed above. It is noted that the series of reply phrases 153 can also be actively displayed, such that an individual can transmit a reply phrase at an increased speed with an authentic tone.

Figure 4I:
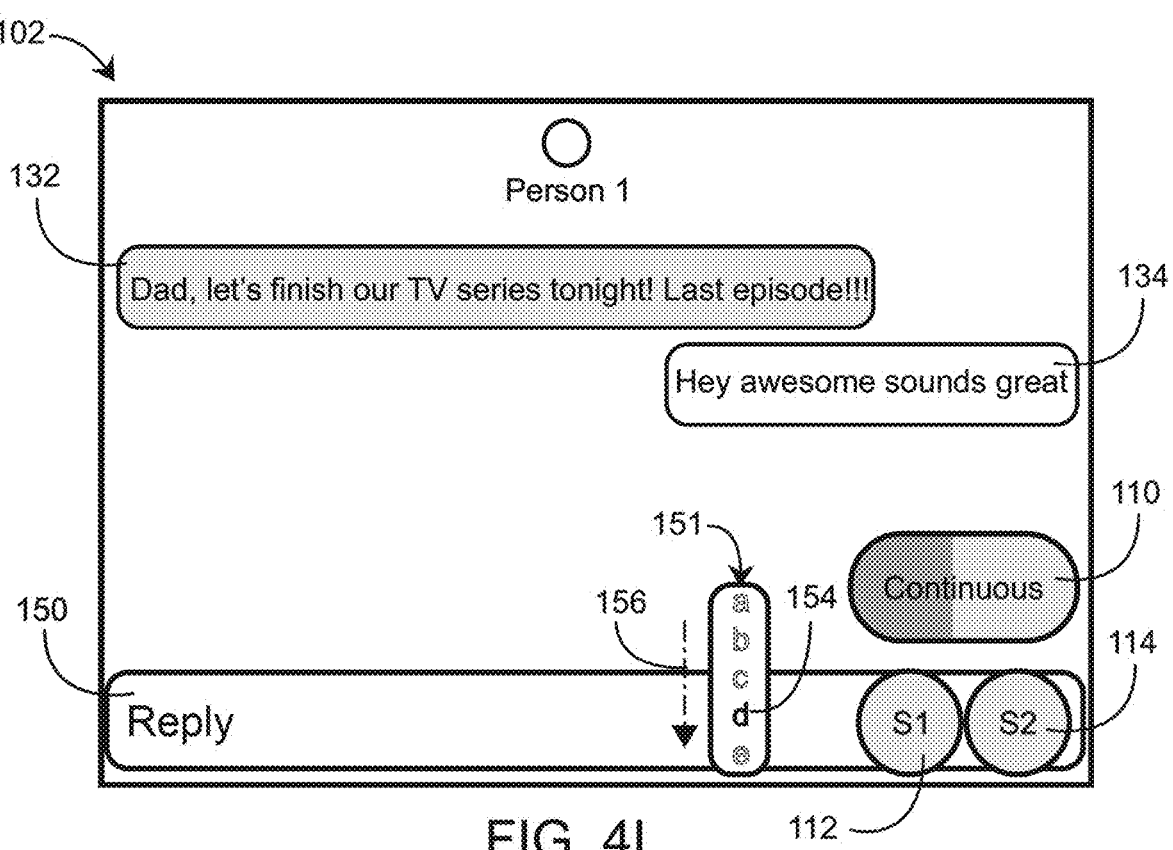

FIG. 4I shows an example of the individual using active display to type a word or phrase by entering each letter.

Figure 4J:
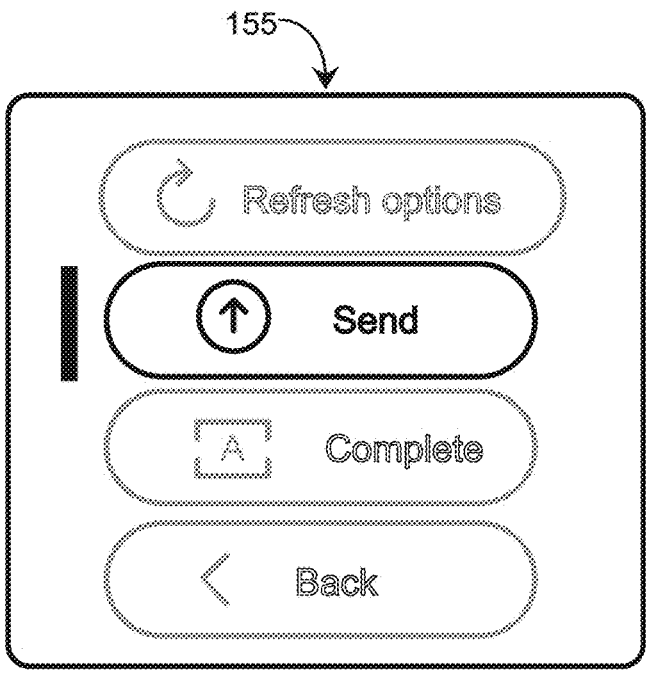

FIG. 4J illustrates an additional variation of a system or method of using active display menu commands that follow the actively displayed words, phrases, and/or letters as discussed above. In this variation, the menu commands follow each cycle of words, phrases, or letters.

Figure 5A:
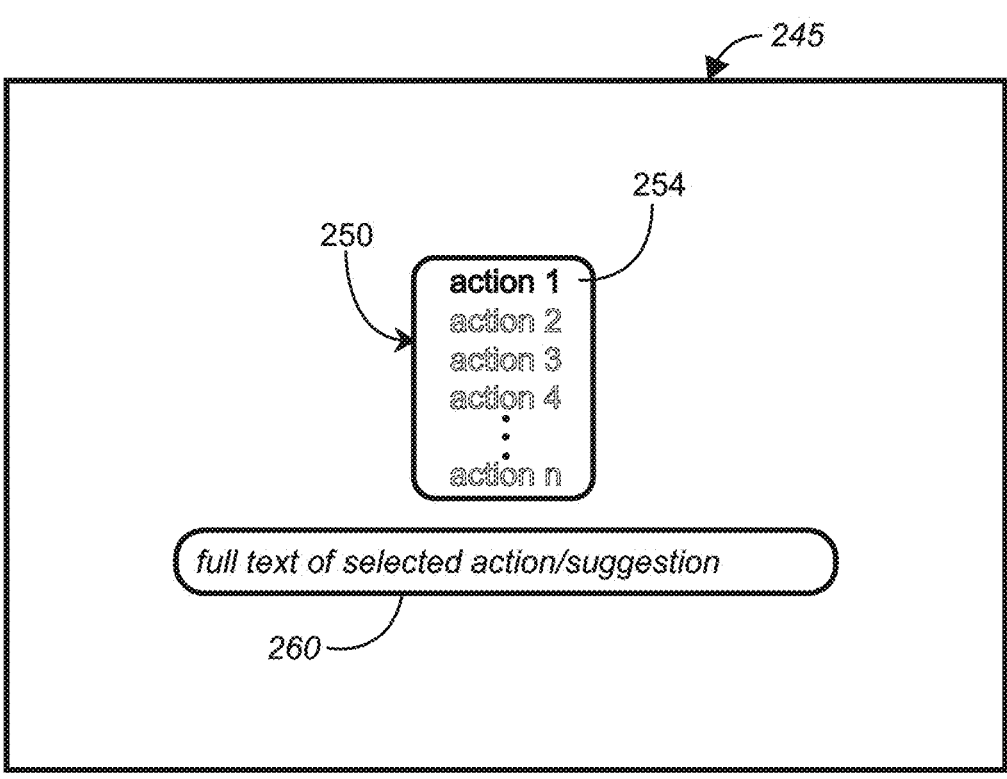
FIGS. 5A and 5B illustrate additional rolodex configurations.
Figure 5B:
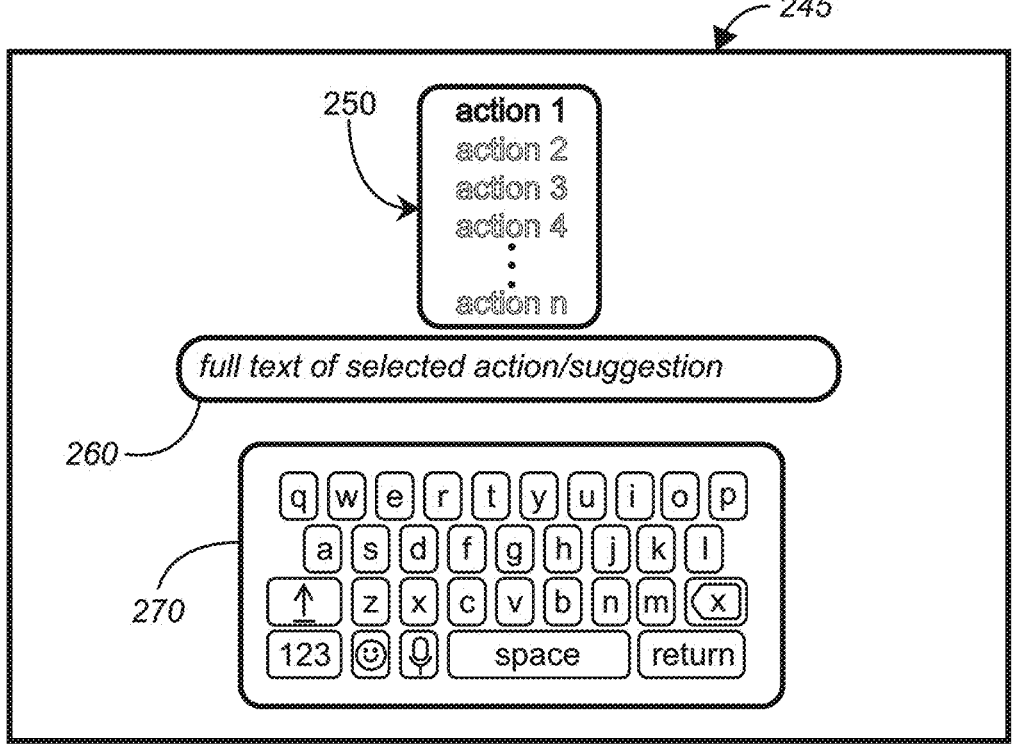

FIGS. 5A and 5B illustrate additional rolodex configurations. While the rolodex configurations shown above illustrate words or phrases, variations of the rolodex configuration 250 as shown in FIG. 5A display any action or actionable item, including, but not limited to commands, letters, multi-letter segments, whole words, phrases, shortcuts, options for the system, sounds, voice, or any other actionable switch that can be triggered using a DMO in the manner described herein.

The rolodex configuration 250 provides a "sequentially active display" in the form of a dynamic rolodex-style selector. Instead of relying solely on a QWERTY keyboard scan or piecemeal letter selection, the interface presents an ergonomic scrollable list 250 (like a rolodex or an electronic rolodex) of actionable items as noted above. This one-dimensional list UI 250 is continuously updated and navigable with a single switch or thought command (such as "next"/"previous"). This is more efficient and therefore expected to be less tiring for the user compared to separate areas (keyboard vs suggestions), including for the reason that the rolodex component allows the user to maintain his or her gaze and attention in one place. The rolodex interface 250 is inherently scanning-friendly (e.g., where the active action can be visually identified as noted above, since it allows the user to cycle through suggestions sequentially with a consistent rhythmic cadence. This is easier to navigate compared to navigating a multi-dimensional keyboard. Each item in the rolodex is visually distinguishable (large text or icons) for easy recognition. The content of this list is dynamic: it can show the alphabet for letter-by-letter composition, but it can also show predicted completions or next-word suggestions on the fly. In practice, as the user starts selecting letters or partial words, the system's language model predicts likely continuations and populates the rolodex with those suggestions in real time. This means the user often can select an entire word or phrase with a single activation instead of spelling it out. As a result, the number of selections (or clicks or DMOs) needed is reduced. For example, if the user intends to say "Hello", after selecting "H", the rolodex might immediately offer "Hello" as a word suggestion, allowing the user to pick it directly. The same rolodex method can apply to common phrases or common replies. As mentioned above, this approach reduces the user's cognitive load and physical effort and allows the user to communicate faster. FIG. 5A also illustrates an optional text bar 260 that can function to provide added text, such as the full text associated with the highlighted action 254. Alternatively, or in combination, the text bar 260 can function as a suggestion bar. FIG. 5B shows yet another variation that includes a rolodex feature 250, a text bar 260, as well as an electronic keyboard 270. In some variations, the text bar 260 itself presents actionable items in a rolodex configuration.

Additionally, the rolodex UI can be paired with an intelligent "send" mechanism. Since composing a message through scanning can still be time-consuming, the system uses AI to detect when a drafted message is likely complete and then either automatically send it or present a send confirmation in the rolodex itself. For instance, if the user has selected a full sentence and pauses, the AI might determine the user is finished and prompt "Send?" as the next item in the rolodex, saving the user extra navigation to a send button. This kind of AI-assisted action prediction further trims the interaction steps needed to communicate.

Another key variant is a dynamic mode menu that allows the user to seamlessly switch the function of their input without additional hardware. In practice, the user can perform a particular sustained gesture or use a secondary switch (such as a second DMO or an external switch) to bring up a mode menu. This on-screen menu lets the user change what their primary control does. For example, toggling from "navigate interface" mode to a "scroll page" mode or to a text entry mode, while still using the same physical movement. Internally, this is achieved by interpreting the same DMO differently depending on the active mode. The innovation here is that the user does not need to learn a new movement for each function; they invoke the mode switch, select a new mode, and then continue with their familiar motor command, which now maps to a different action set. This approach allows the user to use the same DMO to do different actions, such as g. switch from a scan-and-select mode to a continuous scroll. This is done by selecting the mode from a menu. This feature effectively multiplexes the BCI input, leveraging a single motor intention for multiple purposes through mode contextualization.

It should also be noted that the entire system is designed to be platform-agnostic and extensible. While the primary use case is assisting a paralyzed user with an implanted BCI to communicate with a tablet app, the same principles extend to other devices-smartphones, VR/AR glasses, or even smart home interfaces. The architecture supports different output modalities (typing, clicking, gesturing), so the core inventions (context-adaptive scanning, rolodex interface, personalized AI suggestions) could benefit a wide range of human-computer interaction scenarios. For example, in a VR headset, the rolodex might appear as a floating carousel of options, navigable by brain signals, to enable quick text or command entry in virtual environments.

Various changes may be made to the invention described and equivalents (whether recited herein or not included for the sake of some brevity) may be substituted without departing from the true spirit and scope of the invention. Also, any optional feature of the inventive variations may be set forth and claimed independently or in combination with any one or more of the features described herein. Accordingly, the invention contemplates combinations of various aspects of the embodiments or combinations of the embodiments themselves, where possible. Reference to a singular item includes the possibility that there are plural of the same items present. More specifically, as used herein and in the appended claims, the singular forms "a," "and," "said," and "the" include plural references unless the context clearly dictates otherwise.

It is important to note that where possible, aspects of the various described embodiments, or the embodiments themselves can be combined. Where such combinations are intended to be within the scope of this disclosure.

We claim:
1. A method of enabling an individual to use an electronic device through a brain-computer interface that produces one or more digital motor outputs upon receiving intentional brain signals from the individual, the method comprising:

providing an electronic device having an electronic user interface and a processor, where the electronic device is configured to access a user specific data containing a plurality of data associated with the individual;

wherein the processor is configured to identify a set of suggested actions using the user specific data such that at least one suggested action is relevant to the individual, where the set of suggested actions is operable on the electronic device;

displaying at least a plurality of the set of suggested actions on the electronic user interface in a stepwise order, such that the individual selects a selected action from the set of suggested actions using the one or more digital motor outputs; and transmitting the selected action to the electronic device to interact with the electronic device, wherein displaying at least the plurality of the set of suggested actions on the electronic user interface in the stepwise order comprises menu navigation using at least one of the one or more digital motor outputs and dynamic movement that highlights or identifies the selected action from the set of suggested actions, and triggering transmission of the selected action to an electronic device when the individual selects the selected action using the one or more digital motor outputs.

2. The method of claim 1, wherein the processor is configured to identify the set of suggested actions using a first large language model operatively networked to the electronic device and configured to access the user specific data.

3. The method of claim 2, wherein the processor is configured to identify the set of suggested actions using a second large language model configured to access general knowledge.

4. The method of claim 1, wherein at least one suggested action from the set of suggested actions comprises a letter or a number.

5. The method of claim 1, wherein at least one suggested action from the set of suggested actions comprises a series of letter.

6. The method of claim 1, wherein at least one suggested action from the set of suggested actions comprises at least one word.

7. The method of claim 1, wherein at least one suggested action from the set of suggested actions comprises a website hyperlink.

8. The method of claim 1, further comprising obtain a plurality of contextual data associated with the individual and wherein the processor is further configured to identify the set of suggested actions using the plurality of contextual data.

9. The method of claim 1, wherein displaying at least the plurality of the set of suggested actions on the electronic user interface in a stepwise order further comprises cycling through the set of suggested actions in a rolodex-type configuration.

10. The method of claim 1, wherein displaying at least the plurality of the set of suggested actions on the electronic user interface in the stepwise order further comprises sequentially displaying the set of suggested actions.

11. The method of claim 1, wherein the set of suggested actions comprises a set of hyperlinks and wherein displaying at least the plurality of the set of suggested actions on the electronic user interface in the stepwise order comprises sequentially highlighting the set of hyperlinks.

12. A method of enabling an individual to use an electronic device through a brain-computer interface that produces one or more digital motor outputs upon receiving intentional brain signals from the individual, the method comprising:

analyzing a user specific data, where the user specific data comprises a plurality of data associated with the individual;

identifying a set of suggested actions using the user specific data such that at least one suggested action is relevant to the individual, where the set of suggested actions are operable on the electronic device;

displaying, on an electronic user interface, the set of suggested actions in a stepwise order such that the individual is able to select a selected action from the set of suggested actions using the one or more digital motor outputs;

transmitting the selected action to the electronic device to interact with the electronic device, wherein displaying at least the set of suggested actions on the electronic user interface in the stepwise order comprises menu navigation using at least one of the one or more digital motor outputs and dynamic movement that highlights or identifies the selected action from the set of suggested actions, and triggering transmission of the selected action to an electronic device when the individual selects the selected action using the one or more digital motor outputs.

13. The method of claim 12, wherein identifying the set of suggested actions using the user specific data such that at least one suggested action is relevant to the individual, and using a first large language model operatively networked to access the user specific data.

14. The method of claim 13, wherein identifying the set of suggested actions selecting further comprises using a second large language model configured to access general knowledge.

15. The method of claim 12, wherein at least one suggested action from the set of suggested actions comprises a letter or a number.

16. The method of claim 12, wherein at least one suggested action from the set of suggested actions comprises a series of letter.

17. The method of claim 12, wherein at least one suggested action from the set of suggested actions comprises at least one word.

18. The method of claim 12, wherein at least one suggested action from the set of suggested actions comprises a website hyperlink.

19. The method of claim 12, further comprising obtain a plurality of contextual data associated with the individual and wherein identifying the set of suggested actions includes using the plurality of contextual data.

20. The method of claim 12, wherein displaying the set of suggested actions on the electronic user interface in a stepwise order further comprises cycling through the set of suggested actions in a rolodex-type configuration.

21. The method of claim 12, wherein displaying the set of suggested actions on the electronic user interface in the stepwise order further comprises sequentially displaying the set of suggested actions.

22. The method of claim 12, wherein displaying the set of suggested actions on the electronic user interface in the stepwise order comprises moving a cursor over the set of suggested actions.

23. The method of claim 22, wherein the individual can select the selected action when the cursor is near the selected action on the electronic user interface.

24. The method of claim 12, wherein the set of suggested actions comprises a set of hyperlinks and wherein the set of suggested actions on the electronic user interface in the stepwise order comprises sequentially highlighting the set of hyperlinks.

25. A method of facilitating electronic-assisted communication for an individual to respond to an input communication, the method comprising:

providing an electronic assistance device that is in communication with a user database containing a plurality of information associated with the individual;

building a first set of suggested response words using a processor configured to: i) select a plurality of response words that are associated with the individual using the user database; and ii) select the plurality of response words that are conversationally relevant to the input communication;

displaying the first set of suggested response words on the electronic assistance device;

constructing a response phrase by selecting a first response word from the first set of suggested response words;

selecting one or more sequential sets of suggested response words using the processor to identify words that are contextually related to the response phrase;

displaying the one or more sequential sets of suggested response words on the electronic assistance device;

altering the response phrase by selecting a subsequent response word from each of the one or more sequential sets of suggested response words and adding the subsequent response word to the response phrase; and electronically transmitting the response phrase to an external device using the electronic assistance device, wherein selecting the plurality of response words that are associated with the individual using the user database, the plurality of response words that are conversationally relevant to the input communication, the one or more sequential sets of suggested response words, the subsequent response word from each of the one or more sequential sets of suggested response words and adding the subsequent response word to the response phrase, is performed through a brain-computer interface that produces a digital motor output upon receiving an intentional brain signal from an individual.

26. The method of claim 25, wherein displaying the first set of suggested response words on the electronic assistance device comprises individually actively displaying each suggested response word from the first set of suggested response words.

* * * * *